United States Patent
Lundgren et al.

(10) Patent No.: US 11,371,438 B2
(45) Date of Patent: Jun. 28, 2022

(54) MACHINE COMPONENT, PARTICULARLY A TURBOMACHINE COMPONENT, WITH COOLING FEATURES AND A METHOD FOR MANUFACTURING AND OF OPERATION

(71) Applicant: Siemens Energy Global GmbH & Co. KG, Munich (DE)

(72) Inventors: Jan-Erik Lundgren, Svartinge (SE); Erik Munktell, Finspang (SE)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 644 days.

(21) Appl. No.: 16/319,923

(22) PCT Filed: Sep. 26, 2017

(86) PCT No.: PCT/EP2017/074390
§ 371 (c)(1),
(2) Date: Jan. 23, 2019

(87) PCT Pub. No.: WO2018/060200
PCT Pub. Date: Apr. 5, 2018

(65) Prior Publication Data
US 2021/0355878 A1    Nov. 18, 2021

(30) Foreign Application Priority Data
Sep. 30, 2016 (EP) .................................. 16191801

(51) Int. Cl.
*F02C 7/12* (2006.01)
(52) U.S. Cl.
CPC ............ *F02C 7/12* (2013.01); *F05D 2220/32* (2013.01)
(58) Field of Classification Search
CPC ... F01D 9/023; F01D 25/12; F01D 5/182–183
See application file for complete search history.

(56) References Cited

U.S. PATENT DOCUMENTS 5,647,202 A  7/1997 Althaus
2015/0323186 A1 11/2015 Xu
(Continued)

FOREIGN PATENT DOCUMENTS

EP  2905539 A1  8/2015
EP  2930430 A1  10/2015
(Continued)

OTHER PUBLICATIONS

PCT International Search Report and Written Opinion of International Searching Authority dated Sep. 4, 2018 corresponding PCT International Application No. PCT/EP2017/074390 filed Sep. 26, 2017.
(Continued)

*Primary Examiner* — Christopher Verdier
*Assistant Examiner* — Cameron A Corday (57) ABSTRACT

A cooled machine component having a body with at least one integrated cooling channel having a lattice structure for guiding a cooling fluid through an interior, the lattice structure arranged as a void space penetrated by a plurality of hollow or solid struts. The lattice structure has an inlet for providing the cooling fluid to be guided through the void space of the lattice structure, and has an outlet for receiving the cooling fluid, the outlet being fluidically connected to a hollow interior of at least one of the plurality of hollow struts. At least a subset of the hollow struts provides a fluidic connection for cooling fluid from the outlet to a plurality of further downstream discharge ports. Walls of the body surrounding each of the plurality of further downstream discharge ports are physically connected to corresponding jackets of the at least one of the plurality of hollow struts.

12 Claims, 6 Drawing Sheets

(56) References Cited

U.S. PATENT DOCUMENTS

| | | |
|---|---|---|
| 2015/0345298 A1 | 12/2015 | Mongillo et al. |
| 2015/0345304 A1* | 12/2015 | Mongillo ................ F01D 5/183 |
| | | 416/97 R |
| 2015/0345396 A1 | 12/2015 | Zelesky et al. |
| 2016/0025006 A1 | 1/2016 | Propheter-Hinckley et al. |
| 2016/0076384 A1 | 3/2016 | Snyder et al. |
| 2016/0151829 A1 | 6/2016 | Propheter-Hinckley et al. |
| 2016/0194967 A1 | 7/2016 | Xu |
| 2016/0230662 A1 | 8/2016 | Kostka, Jr. et al. |
| 2017/0211807 A1 | 7/2017 | Graichen |
| 2018/0334909 A1 | 11/2018 | Mongillo et al. |

FOREIGN PATENT DOCUMENTS

| | | |
|---|---|---|
| EP | 3020924 A1 | 5/2016 |
| EP | 3056671 A1 | 8/2016 |
| JP | H08233253 A | 9/1996 |
| WO | 2014105108 A1 | 7/2014 |
| WO | 2015009448 A1 | 1/2015 |

OTHER PUBLICATIONS

EP search report dated Apr. 7, 2017 for corresponding EP patent application No. 16191801.6.

\* cited by examiner

FIG 11

MACHINE COMPONENT, PARTICULARLY A TURBOMACHINE COMPONENT, WITH COOLING FEATURES AND A METHOD FOR MANUFACTURING AND OF OPERATION

CROSS REFERENCE TO RELATED APPLICATIONS

This application is the US National Stage of International Application No. PCT/EP2017/074390 filed Sep. 26, 2017, and claims the benefit thereof. The International Application claims the benefit of European Application No. EP16191801 filed Sep. 30, 2016. All of the applications are incorporated by reference herein in their entirety.

FIELD OF THE INVENTION

The invention relates to a machine component, particularly a gas turbine component or any turbomachine component, even more particularly a gas turbine combustor or burner component, in which a hot surface can be cooled via a specific internal hollow structure of the machine component. Furthermore the invention relates to a method for manufacturing such a component and of operation of such a component.

BACKGROUND OF THE INVENTION

Gas turbine engines like other rotating machines or turbomachines comprise sections in which high temperatures are experienced during operation. Also other machines experience high temperatures, but the focus on explaining the advantages of the discussed solution will be explained in the following—purely exemplary—for a gas turbine combustor. Nevertheless, the proposed solution is applicable to all types of machine components that require cooling, particularly machines made of metal or alloys in which the material can provide a heat transfer.

Focusing now on gas turbines, in the gas turbine engine typically ambient air as a fairly cool fluid may be compressed by a compressor section and provided to a combustor in which the substantially cool fluid (the temperature of the compressed air may be several hundred degree Celsius but at least cooler than the working conditions within the combustor of the gas turbine engine) will be burned together with fuel to provide a driving force for a subsequent turbine section in which a hot fluid from the combustor will drive rotor blades of the turbine to drive again a shaft.

In the combustor or in the downstream sections past the combustor hot temperatures can occur on components that are guiding the hot fluid through the gas turbine engine. The temperatures can be up to 1,500° C. or even higher. Nevertheless, materials used typically in a gas turbine engine cannot withstand temperatures above 800° C. Therefore, these components may need to be cooled or a specific coating is required to protect the component. Cooling may be implemented in a way that a fraction of the air or the fluid from the compressor is extracted—i.e. branched off from a main fluid path—and guided to the component which needs to be cooled. Cooling then can be performed at the to be cooled part by different measures, for example impingement cooling, film cooling, effusion cooling, transpiration cooling and/or convection cooling.

The provision of cooling functionality on the other hand reduces the efficiency of the gas turbine engine. Therefore it is the goal to limit the cooling as much as possible so that the efficiency does not downgrade and is maximised. But it has to be appreciated that the lifetime of the component depends largely on that the component will not experience a temperature that goes above an expected temperature level.

The temperature level experienced by a component may vary at different locations within the engine. For example an upstream region of a combustion liner wall may experience hotter temperatures than a downstream region of the same combustion liner. The hottest regions in a gas turbine engine are located in the combustor.

Generally, components to be cooled in a gas turbine engine are substantially parts in the combustion chamber, the turbine section and a transition piece, i.e. a transition duct located between the combustion chamber and the turbine section.

Other type of machines may experience heat at different locations but a similar need for cooling may exist there as well. On machines that do not generate a flow of air on their own, possibly a fan or a compressor may be needed to provide an air flow that can be used for cooling.

According to WO 2014/105108 A1 a vascular engineered lattice structure formed inside of a component wall is known. In the examples complex mechanical structures are disclosed with an embedded complex passage structure to guide an airflow. Film holes may be present at a hot external surface. Inlet holes distant to the hot external surface may be formed as cylindrical struts. Outlet holes to the hot external surface may be curved to form a film cooling effect.

It is an aim to provide a specific cooling mechanism that provides an effective cooling.

SUMMARY OF THE INVENTION

The present invention seeks to provide an improved cooling solution, usable particularly for combustors of a gas turbine engine or other types of machines that require cooling.

This objective is achieved by the independent claims. The dependent claims describe advantageous developments and modifications of the invention.

In accordance with the invention there is provided cooled machine component, particularly a turbomachine component, e.g. a gas turbine component like a combustor of a gas turbine. The cooled machine component comprises a body with at least one integrated cooling channel for guiding a cooling fluid through an interior of the body, the cooling channel comprising a lattice structure. The body is advantageously a heat conducting element, e.g. made from metal or an alloy. The body is advantageously substantially solid, but with hollow regions. The lattice structure defines a region that is partly solid and partly hollow. In more detail, the lattice structure is arranged as a void space penetrated by a plurality of hollow struts. Optionally the void space is additionally penetrated by a plurality of solid struts. Besides, the lattice structure comprises at least one inlet for providing the cooling fluid to be guided through the void space of the lattice structure, and comprises at least one outlet for receiving the cooling fluid that has been guided through the void space of the lattice structure, the at least one outlet being fluidically connected to a hollow interior of at least one of the plurality of hollow struts. At least a subset of the plurality of hollow struts provide a fluidic connection for cooling fluid from the at least one outlet of the void space of the lattice structure to a plurality of further downstream discharge ports. Walls of the body surrounding each of the plurality of further downstream discharge ports are physically connected to corresponding jackets of the at least one of the plurality of hollow struts. Each one of a subset of the plurality of hollow struts is arranged either perpendicular to the end face or with a maximum deviation from a perpendicular direction to the end face of 45°.

That means, that during operation a cooling fluid may be provided via the at least one inlet into the lattice structure and passes along skin surfaces of the hollow struts and the optional solid struts within the lattice, and further on, once the cooling fluid is collected by the at least one outlet, guided through the interior of the—same—hollow struts. That means the solid portions of the hollow struts are cooled twice, once from the outside and once from the inside. The cooling established via the solid and hollow struts may be particularly convection cooling.

As the jackets of the hollow struts are directly connected to the hot surface of the walls of the body, heat will be guided from the hot surface along the jackets into a core area of the body, enabling the cooling channels to be most effective. Heat is in some respect pulled into the body, as the jackets of the hollow struts are connected to the hottest part of the body, and the hollow struts are enabled with two cooling procedures, an inner and an outer cooling of the jackets.

Thus, the lattice structure is part of a fluidic system through which cooling fluid is guidable. The void of the lattice structure is configured such that the cooling fluid is able to flow through the lattice structure from the inlet to the outlet, particularly without having "blind regions" in which no cooling fluid travels.

The struts are thermally coupled to the rest of the body so that heat from the rest of the body is transferred to the struts, so that the cooling fluid can "attack" hot surfaces of the struts. Advantageously the struts are fully integrated with the body. Particularly the struts, i.e. its jacket material, is connected to a hot surface side of the body.

With "cooled machine component" it is defined a machine component that will be cooled during operation. Thus, the machine component comprises cooling features, as explained above and also in the following paragraphs.

The machine component can be structured that it comprises a body with a first, a second and a third section. The first section may be adjacent to a source of thermal radiation. The original source of thermal radiation is advantageously located outside of the body, like a combustion chamber or a flame. The first section may also include an end face of the machine component. The second section may define the lattice structure, adjacent to the first section. The third section is a section of the machine component that is oriented away from the source of thermal radiation. The third section may be located in a region of a lower temperature compared to the temperature of the first section. The first, second and third section are advantageously integrally formed with another, i.e. they are single or unitary piece. They are portions of the monolithic body. Advantageously, they are also made from a same material.

The end face, during operation, is exposable to a first temperature higher than a second temperature of a cooling fluid. This will heat the first section, and in consequence, as they are a single piece made from the same material—advantageously metal or an alloy—the heat transfers to the second and further to the third section. Without cooling—contrary to the invention—all three sections would substantially have the same temperature level of the material when the heat source thermally affects the body for a longer period in time. Now according to the invention, a cooling fluid is provided mainly in the second section, thus cooling the second section, which in consequence also cools adjacent material of the first section. The third section, with applied cooling in the second section, would not even reach as high temperatures, because the second section defines substantially a barrier for a heat transfer.

The second section is located between the first and the third section and is advantageously formed in parts as a lattice structure. Such a lattice structure comprises a plurality of rod-shaped struts—some hollow, and optionally some solid—, and a void penetrated by the plurality of struts, the void providing at least one fluid passage via which the cooling fluid is guidable through an interior of the second section during operation.

The hollow struts have each a first end, the first end being connected to the first section to provide a heat transfer from the first section to the second section.

Each one of a subset of the plurality of hollow struts are arranged either perpendicular to the end face or with a maximum deviation from a perpendicular direction to the end face of 45°. That means the hollow struts optionally may be angled in relation to the end face. That means if you define the orientation of the hollow strut as a Euclidian vector, you can say that the larger vector component of the vector is directed parallel to the normal of the end face whereas the smaller vector component of the vector is in direction parallel to the end face. Advantageously a hole through the end face is substantially perpendicular or angled to the end face such that a film cooling effect is avoided.

The same configuration, as explained in the previous paragraph for the hollow struts, may also apply to the solid struts. Alternatively, one solid strut may connect to one hollow strut in any possible angle, like cross-bars or angled bars between a pair of adjacent hollow struts.

Coming back to the hollow struts and as previously stated, at least a subset of the plurality of hollow struts provide a fluidic connection for cooling fluid from the at least one outlet of the void space of the lattice structure to a plurality of further downstream discharge ports. Furthermore, another subset of the plurality of hollow struts may advantageously provide a fluidic connection for cooling fluid from the at least one outlet of the void space of the lattice structure to further downstream cooling fluid passages. The cooling fluid passages may be located in the previously introduced first section of the body, i.e. a hot area of the component. The discharge ports may pierce the end face of the body, i.e. the surface that is affected by an external heat source.

It might be that the cooling fluid passages are a direct continuation of the hollow struts such that the both are arranged axially. There may also be a one-to-one relation between the hollow struts and downstream cooling fluid passages or discharge ports.

So far the connection between the at least one outlet of the lattice structure to the interior of the hollow struts has not been explained in detail. In an embodiment the fluidic connection from the at least one outlet to the hollow interior of the at least one of the plurality of hollow struts is provided by connecting the at least one outlet to a plenum chamber, the plenum chamber in turn being connected to the hollow interior of the at least one of the plurality of hollow struts.

Structurally, the plenum chamber may be substantially parallel to the lattice structure. Furthermore, in respect of flow direction, a flow direction through the plenum chamber may be substantially oriented in opposite direction than a flow through the void of the lattice structure.

All the fluid guiding components, i.e. the inlet of the lattice structure, the void of the lattice structure, the outlet of the lattice structure, the plenum (if present), and the interior of the hollow struts, can be considered, together with upstream supply channels and downstream passages and/or discharge ports, as one single fluidic system.

At least a subset of the struts—the hollow and the solid struts both may be called commonly struts—or even all struts are advantageously rod-shaped. The struts in this shape can also be called pylons. The struts may be columnar. The struts, at least in parts, may be cylindrical, particularly circle-cylindrical or elliptic-cylindrical. These configurations are beneficial as cooling fluid can pass along the full circumference of the respective strut to cool the struts from their peripheral surface. Additionally, as mentioned before, a subset or all of the struts are configured as hollow struts to cool the strut even more by guiding cooling fluid along the inside of the hollow struts.

Each one of at least a subset of the plurality of hollow struts may be free of apertures in its jacket—i.e. its shell or peripheral surface or boundary wall—between the void space and the hollow interior. In consequence no shortcut for cooling fluid is created, i.e. no direct through-hole through the hollow struts from the void to the interior of the hollow strut.

The struts act as cooling struts. The hot struts are cooled from a cooling fluid, guided along—inner and/or outer—surfaces of the cooling struts. The hollow struts can be considered "double cooled" components.

According to the invention the same cooling fluid may be guided along the outside and later on also along the inside of the hollow struts so that the amount of needed cooling fluid—e.g. air—can be low and no cooling fluid is wasted in respect of cooling.

The struts provide sufficient heat conduction so that the elevated temperatures from the first section—to which all or a plurality of the struts are connected—are brought into the lattice structure via the struts. The heat internal to the struts can be conveyed by passing-by cooling fluid through the void of the lattice structure and due to the flow through the interior of the hollow struts. The void penetrated or pierced by the plurality of struts defines the flow path in form of a meander. The cooling fluid is passing by a large number of struts and thereby winds through the lattice structure and providing a good heat transfer for cooling the first section of the body of the machine component.

Nevertheless it is possible to define a main travel direction—a nominal flow direction—of the cooling fluid through the void space. Positions of the at least one inlet and of the at least one outlet may define a main travel direction through the void space. At least a subset of the plurality of hollow struts may are oriented substantially laterally to the main travel direction of the cooling fluid through the void space. The main travel direction may be substantially parallel to the end face of the body.

A flow direction through the plenum may be substantially opposite to the main travel direction through the void space.

The lattice structure is a complex cavity which is enclosed by walls—the walls being part of the body—, wherein air or any type of cooling fluid can be guided through the lattice structure. As said, struts are present in the lattice structure. The struts may be arranged in a structured way, like defining a periodical structure, i.e. arranged in rows and columns, advantageously in a grid pattern or staggered.

Alternatively the struts may also be arranged in a chaotic pattern which allows a complex flow path of the cooling fluid through the lattice structure.

In an embodiment, each one of at least a first subset of the solid struts may be angled to a neighbouring one of the hollow struts, particularly intersecting one of the hollow struts. So the solid struts may be cross bars for the hollow struts, perpendicular to the hollow struts or angled to the hollow struts. In one preferred embodiment the solid struts may be angled between 30° and 60°—particularly 45°—to the hollow struts. This generates a quite meshed configuration of the lattice generating a large number of surfaces that can be affected by the cooling fluid.

The plurality of struts may have several sets or segments of similarly arranged strut structures, for example being periodical. In one embodiment the segments may define fluidically independent lattice structures—arranged in separate compartments—, separated by walls of the body. So while one cooling channel passes through a first lattice structure, a second cooling channel may pass through a second independent lattice structure. Thus, these may be completely independent and separate fluid systems.

Each one of the segments may advantageously comprise a plurality of discharge ports—i.e. exhaust ports for cooling fluid through the end face—, particularly each individual discharge port is provided with cooling fluid from a single one of the plurality of hollow struts, thus having a one-to-one relation of hollow struts and discharge ports.

Each of such a segment or compartment may have its own dedicated inlet(s) and outlet(s) to the lattice structure. If the machine component will experience different temperature levels at different regions possibly also different lattice structure design can be applied according to the expected temperature distribution along the compartments of the machine component.

Focusing in more detail on the struts, the fluid passage through the void of the lattice structure may be, at least partially, substantially transverse to an expanse of the hollow struts. Thus, the struts may extend into the fluid passage. The solid struts may be arranged as solid cylinders. The hollow struts may be arranged as hollow cylinders. Additionally or alternatively the struts may at least have a conical section or may be completely conical. In such a design, the part with the widest cross sectional area of the cone may be arranged in direction of the first section to connect to the first section. The cone may again be a solid structure meaning that the cone of the strut will not be hollow. The cone may be defined by an angle of its lateral surface between 2° and 45°. Advantageously the range of the angels is between 5° and 30°. The angle may be taken between a rotational axis of the cone and its lateral surface. The angle may specifically be the interior angle at the tip end of the cone.

If the strut has only two sections, a conical section and a cylindrical section, the cone may be arranged as a truncated cone in which the truncated top may merge to the cylindrical form of the remainder of the strut without any step. In such a case, the conical part may be 5 to 50% of the overall length of the strut. The remainder of the strut may be cylindrical. This allows a good heat transfer from the first section into the lattice structure through which the cooling fluid will be guided.

Advantageously a first subset and a second subset of the first set of the plurality of struts are staggered. Therefore cooling air will need to wind through the first and the consecutive second subset of struts so that an improved heat transfer occurs.

Struts may intersect each other—particularly if one set of struts is angled in respect of another set of struts—or parallel struts may be connected via crossbars between the struts. This could lead to a better heat transfer and/or to a better stability of the lattice structure.

Focusing now on the preferred implementation in a gas turbine engine, the cooled machine component particularly may be a gas turbine component like a heat shield or a blade or a guide vane, even more particularly a gas turbine combustor or burner component like a combustion liner or a burner tip or a burner front face. The cooling fluid may advantageously be air, possibly provided from a compressor of the gas turbine engine. The first section may be a front surface directed to a hollow space in which the heat source is located, e.g. in which a combustion flame may be formed, during operation.

As said, the invention is particularly applicable for combustor components that are exposed to combustor environment, i.e. by radiation and/or convection heat of combustion flames.

It may particularly be used where a hot flame, e.g. either main or pilot flame, creates convection heat and thermal radiation so that adjacent components are heated.

Outside the gas turbine field, it may also be used for cooling motors, steam turbines, compressors, pumps or components used in the metalworking industry.

Furthermore the invention relates to a method for manufacturing of a cooled machine component comprising the steps of generating the turbomachine component as previously defined as an integrally formed—i.e. monolithic or single piece—component via additive manufacturing techniques, particularly selective laser sintering or selective laser melting or electronic beam melting, i.e. therefore building layer by layer a single component. By these additive manufacturing techniques even a highly complex lattice structure can be built. Integrally formed components can be built by the mentioned techniques such that applied powder is melted during production and solidifies to a single piece.

The produced part is typically a component built from a common material. The additively manufactured part may be the overall machine component or only a section of it, but at least the region of the lattice structure, so that the plurality of hollow struts, the plurality of solid struts and the body may be generated via additive manufacturing techniques.

As said, the lattice structure may advantageously be generated by additive manufacturing technology like selective laser sintering (SLS) or selective laser melting (SLM). Alternatively, electron beam melting (EBM) can be used. These additive manufacturing techniques are advantageous as they allow very complex structures that cannot be generated by previous known techniques like cutting or drilling into a solid body.

Particularly the overall integrated body including its previously identified three sections are integrally formed with another and including the struts may be built by a common additive manufacturing process. In consequence the body is built by just a single manufacturing method. Thus, the sections are not built separately and not joined in a consecutive step.

The first section and the third section can also be considered to be a casing for the lattice structure. The first section and the third section can provide a mechanical structure to which the struts can be connected and can define an enclosure for the lattice structure so that the cooling fluid can pass and is guided through the lattice structure. The first section may also act as a boundary wall to the combustion zone. The third section can be a further wall, e.g. for mounting the body to further components.

The end face may particularly be a surface that is opposite to a space in which hot temperatures may occur. This may particularly be a combustion zone in which hot combustion will be performed during operation of a combustion chamber of a gas turbine engine. This may also be a pre-mixing zone of the combustor. Typical combustion temperatures may be between 1300 and 2000° C. Such elevated temperatures may require specific cooling. This cooling is provided according to the invention by the lattice structure with hollow and optionally also solid struts through which a cooling air or a cooling fluid can be guided. This cooling fluid can particularly be air extracted from a combustor of the gas turbine engine. The exit temperature of a compressor may be 350 to 550° C. but definitely will be below the combustion temperatures so the fluid has such a low temperature compared to the combustion temperatures so that it provides sufficient cooling if guided through the lattice structure.

To reduce stress in the material of the body at least the solid struts could be arranged in a semi-detached way such that only one end of a respective strut is connected to the first section whereas the other end of the struts is free from further connections, particularly not connected to the third section.

You could define the second section with a lattice structure as a body in which a specific percentage of the volume is consumed by solid parts of the lattice whereas another percentage of the body is taken by the void of the lattice. The material of the first and third section and other walls of the second section is not considered in the further analysis. As one preferred example, this consumption of material compared to void may be substantially equal, i.e. 50% to 50%.

In another example the volume rate of solid material in the second section in relation to the hollow space of the void in the second section may be between 0.3 and 2.5, advantageously between 0.4 and 2.0.

These different configurations may be adapted for the specific needs of a component and adapted for the pressure and throughput of the cooling fluid through the lattice structure.

In a specific embodiment a ratio between a volume of the void and a volume of solid material of the lattice structure in the second section may be reduced in direction to the end face. Therefore, a higher amount of solid material will be present closer in the direction of the first section whereas a lesser dense structure is provided in the lattice structure in the direction of the third section. This may be advantageously used to provide even a better cooling of the heated first section.

Coming back to the embodiment of a gas turbine combustor, the cooling fluid which is guided through the lattice structure may be exhausted into the combustion zone if this invention is applied to a burner or to a combustor. In such a configuration the cooling fluid may additionally be used as a chemical component for the combustion in the combustion zone so that it gets mixed with the fuel, so that the mixed fluid is burned within the combustion zone. In a specific configuration this cooling fluid may be called pilot air which is provided into a region where the pilot fuel of a combustor is injected into the combustion space.

Fuel passages may also be incorporated within the body. Typically the fluid passages will be kept fluidically separate to the cooling channels. The lattice structure itself is specifically used for cooling. Therefore no fuel and air mixing takes place within the lattice structure.

The invention may also relate to a method of manufacturing and a method of operating such a cooled machine component, particularly a gas turbine engine component.

The lattice structure is typically made of metal or an alloy built via additive manufacturing. Such a metal lattice structure particularly shall not be considered similar to a configuration made of sheet metal which has ribs attached to the sheet metal so that fairly large distances are generated between two parallel ribs of sheet metal. A lattice structure may be particularly be a much more complex structure with a large number of small struts which are more the type of a pillar and not the type of a expanded wall.

To distinguish from prior art designs with ribs on combustion liners, there may be 5, 10, 20, 30 or even 40 struts per square centimeter, thus there is a high number of struts present in the lattice structure. The struts specifically are not simply spacers to connect and keep distant to another two parallel walls, e.g. of a combustion liner in a dual wall configuration. The number of struts is much higher that the number of spacers of prior art designs.

As indicated before the invention also relates to a method of operation of such a machine component in which cooling fluid is provided through the void so that the plurality of struts are affected by convection cooling. Particularly due to pressure differences the cooling fluid is guided through the void, in particular by creating a cross-flow with the struts erecting into the cross-flow.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

Furthermore examples have been and will be disclosed in the following sections by reference to gas turbine engines. The invention is also applicable for any type of turbomachinery, e.g. compressors, pumps or steam turbines. Furthermore the general concept can be applied even more generally to any type of machine in which elevated temperatures occur. It can be applied to rotating parts as well as stationary parts.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematic. It is noted that for similar or identical elements in different figures, the same reference signs will be used.

Some of the features and especially the advantages will be explained for an assembled and operating gas turbine, but obviously the features can be applied also to the single components of the gas turbine or even other turbo machines but may show the advantages only once assembled and during operation. But when explained by means of a gas turbine during operation none of the details should be limited to a gas turbine while in operation.

As already mentioned, the invention may also apply to different machines that are affected by heat, but examples are explained mainly for a gas turbine burner.

DETAILED DESCRIPTION OF THE INVENTION

Figure 1:
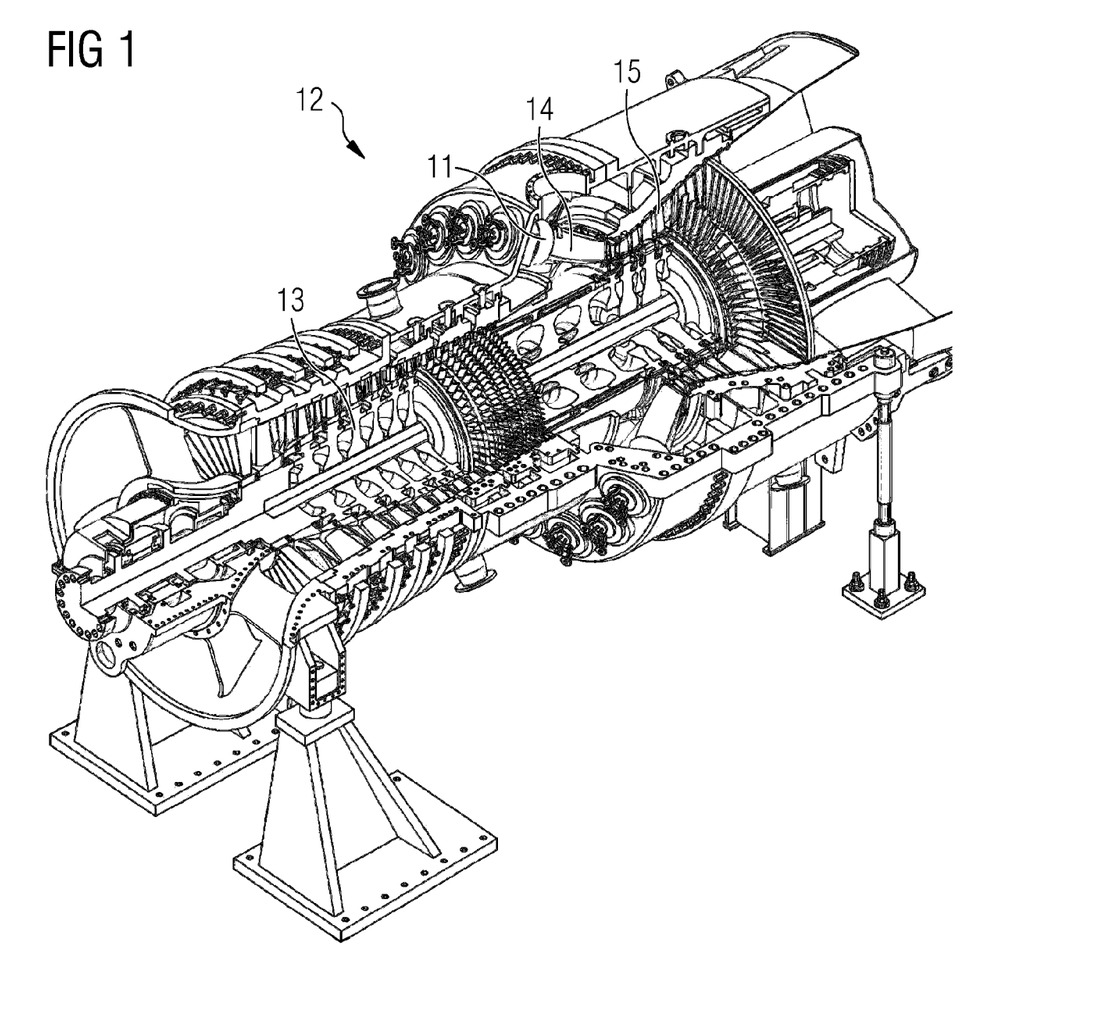
FIG. 1: shows schematically of an exemplary gas turbine engine for which the invention can be used.

Referring now to FIG. 1, a schematic view of an exemplary gas turbine 12 is shown. The gas turbine 12 (also called gas turbine engine) comprises a compressor 13, a combustion chamber 14 and a turbine 15 as it is known per se. In this gas turbine 12 a burner 11—for example comprising a pilot burner—is arranged in front of the combustion chamber 14.

The compressor 13 compresses a fluid that is provided to the compressor 13, particularly ambient air. While compressing, the temperature of the fluid increases. Nevertheless, the compressed fluid may be used at the combustion chamber 14, at the burner 11 or in the turbine 15 for cooling purposes. In this respect this fluid may also be called cooling fluid or cooling air.

Figure 2:
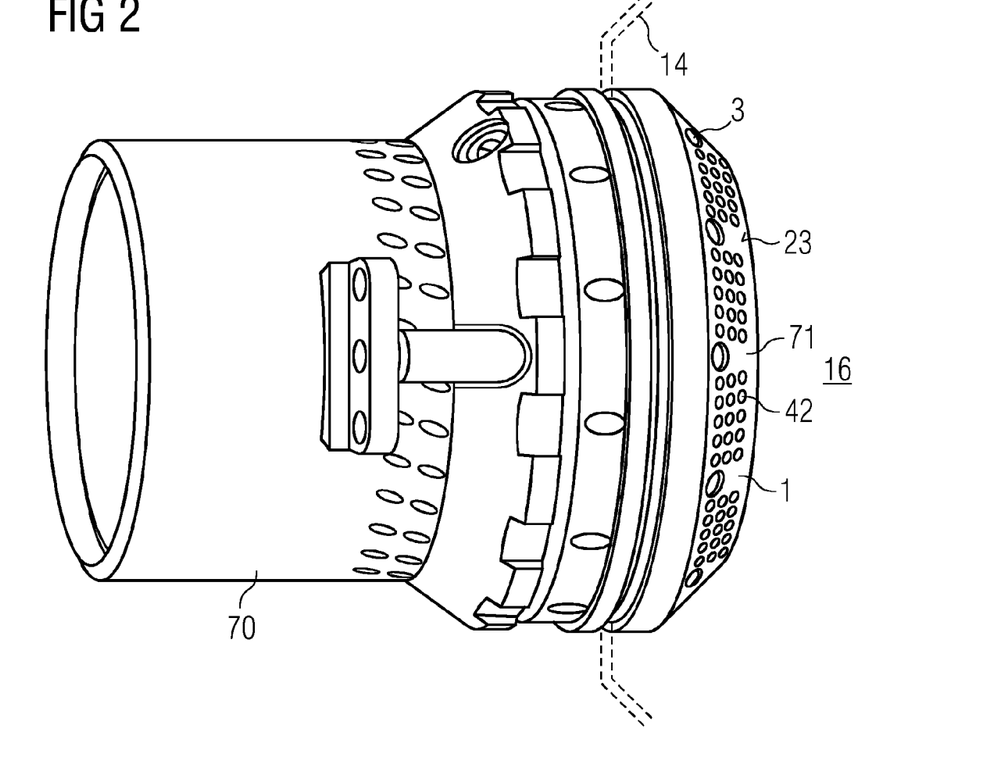
FIG. 2: shows an exemplary burner head into which the lattice structure can be embedded.

Particularly an embodiment of the invention may be applied to a burner head 70 as shown in FIG. 2, and more particularly to a pilot burner section 71, which is later on also shown in the following figures. This pilot burner section 71 is considered a cooled machine component 1.

Following the burner head 70 and particularly the pilot burner section 71, a combustion zone 16 will establish during operation within the combustion chamber 14. The pilot burner section 71 provides an end face 23 on which a plurality of fuel nozzles 3 and a plurality of discharge ports 42 for cooling fluid are present. In the depicted example the plurality of discharge ports 42 are arranged in groups and each group is structured in rows and columns.

Figure 3:
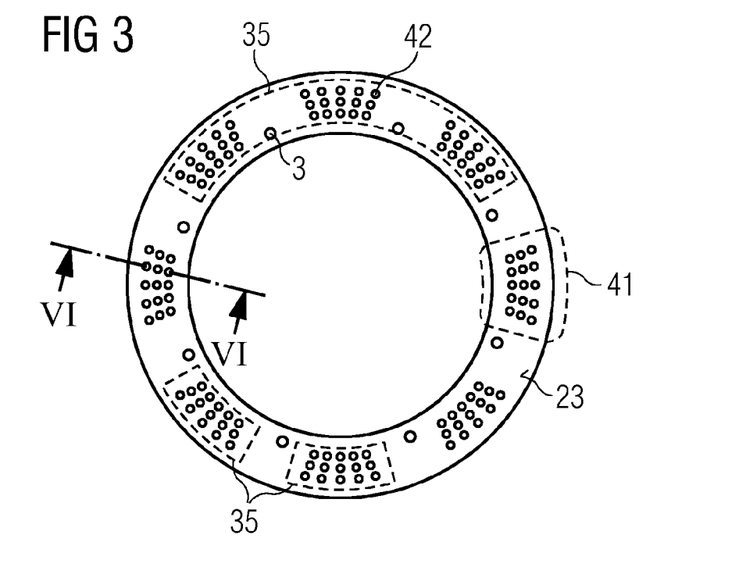
FIG. 3 shows a tip section, a pilot burner section, of the burner head as shown in FIG. 2.

A very similar end face 23, as previously shown in FIG. 2, is also shown in FIG. 3 from a different angle. In this figure the point of view is from a combustion chamber 14, so that the end face 23 of the pilot burner section 71 appears as a circular ring. As previously indicated, the discharge ports 42 are arranged in blocks or segments 41. Underneath the end face 23, incorporated in the body of the pilot burner section 71, a void space 35 is present, which is only indicated as dotted lines as not being visible to the outside. The void space 35 will be explained in more detail in reference to the following figures. In the figure different sized void spaces 35 are indicated, some will only cover a short segment and one covers a larger segment (about ⅓ of the overall end face 23. Alternatively, not shown in FIG. 3, the void space 35 could be completely annular.

Several of the following figures show—at least partly—a sectional view, which is taken along line VI-VI, as indicated in FIG. 3. It has to be noted though, that not all the following figures show the exact same number of discharge ports 42, and in some figures the discharge ports 42 are staggered, and not in rows and columns as in FIG. 3.

Nevertheless, the components as seen in following figures could be embedded in the pilot burner section 71 as shown in FIG. 3.

In relation to FIG. 4 the main features of the invention will be explained in more detail. Further clarification of some details or alternative solutions will be shown with the consecutive figures.

Figure 4:
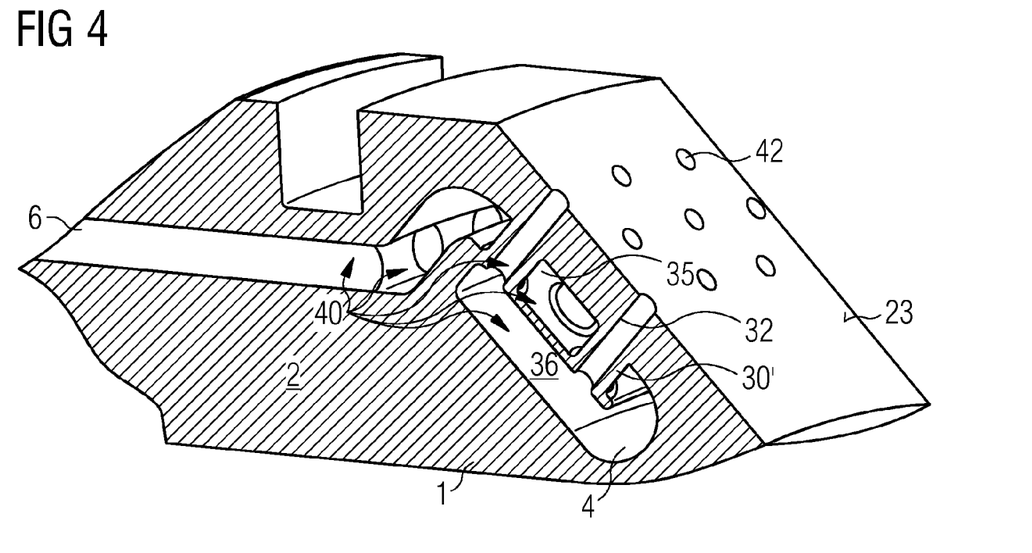
FIG. 4: shows an angled view merging into a sectional view of an exemplary burner head and illustrates a first version of an enclosed lattice structure and correlating features.

In FIG. 4 a segment of the pilot burner section 71 is shown, showing a segment of the end face 23 and also a cross section along an axial plane in respect of a burner axis. A substantially solid body 2 is shown with one integrated cooling channel 40—only one channel is shown but several of these may be present in the overall component—for guiding a cooling fluid through an interior of the body 2. The cooling channel (40) comprises a plurality of inlets 6, a void space 35 including a lattice structure (which is not clearly shown in this figure), an outlet 4 of the void space 35, a plenum chamber 36, a plurality of hollow struts 30' each with a hollow interior 32, and discharge ports 42 piercing the end face 23. All these components are part of a fluidic system, so that cooling fluid can be guided through this fluidic system to cool the material of the end face 23.

The discharge ports 42 may be arranged particularly perpendicular to the end face 23, i.e. not forming film cooling holes. The goal of the invention is primarily to cool the body 2 from the inside of the body 2.

Figure 5:
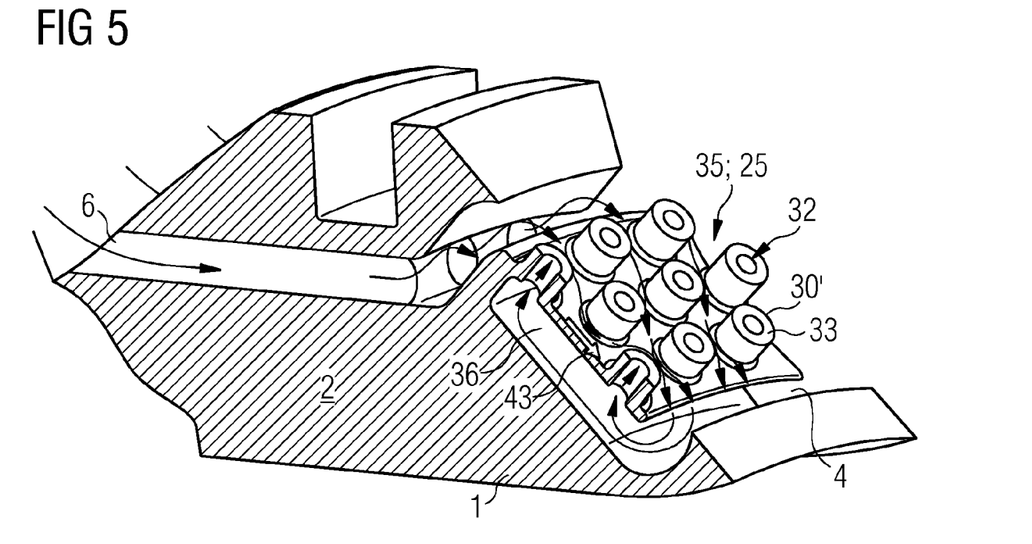
FIG. 5: shows the embodiment of FIG. 4 with another cut through the lattice structure to illustrate hidden features.

The same configuration is shown in more detail in FIG. 5, now with a further cross section through the void space 35. Furthermore a fluid flow of cooling fluid is indicated by arrows. The void space 35 comprises the plurality of hollow struts 30' and thereby forms a lattice structure 25. The hollow struts 30' each comprise the hollow interior 32 and a jacket 33. A local flow direction, which meanders around the exterior of the hollow struts 30' and later through the plenum chamber 36 and the interior 32 of the hollow struts 30', is indicated by arrows. A main travel direction 43 through the void is indicated by a double arrow.

As it can be seen, at an upstream end of the void space 35 cooling fluid is provided along a first expanse of the void space 35. Consecutively, the cooling fluid winds through the void space 35 effectively in direction of a main travel direction 43. A downstream end and the outlet 4 of the void space 35 is—like the upstream end of the void space 35—an expanded region along the first expanse of the void space 35. According to the figure, a curvature is present at the outlet 4, so that the cooling fluid travels into the plenum chamber 36 in substantially opposite direction that the main travel direction 43 through the void space 35. The plenum chamber 36 is an "empty" chamber, advantageously free of struts. Boundary walls of the plenum chamber 36 may be substantially flat. Alternatively, not shown, the plenum chamber 36 may have a surface structure that supports diversion of cooling fluid into the interior 32 of the hollow struts 30'.

Besides the mentioned outlet 4 of the void space 35, which also acts as a consecutive inlet to the plenum chamber 36, and upstream ends of the interior 32 of the hollow struts 30', the plenum chamber 36 may be free of further passages or through-holes.

By having such a lattice structure 25 as previously defined the cooling effect is improved. Cooling fluid acts upon outer and inner surfaces of the hollow struts 30'. In consequence, an elevated temperature of the body 2 can be reduced. This effect particularly takes place, if all mentioned elements of the body 2 are integrated with another—forming a single piece component—and when the material of the body conducts heat, like metal or alloys. In an advantageous embodiment the body 2 with all its sub structures is produced by additive manufacturing, particularly selective laser sintering or selective laser melting, as these methods allow production of fine structures.

So far the lattice structure 25 was solely comprised of hollow struts 30'. As depicted in the following figures, additionally also solid struts may be present.

Figure 6:
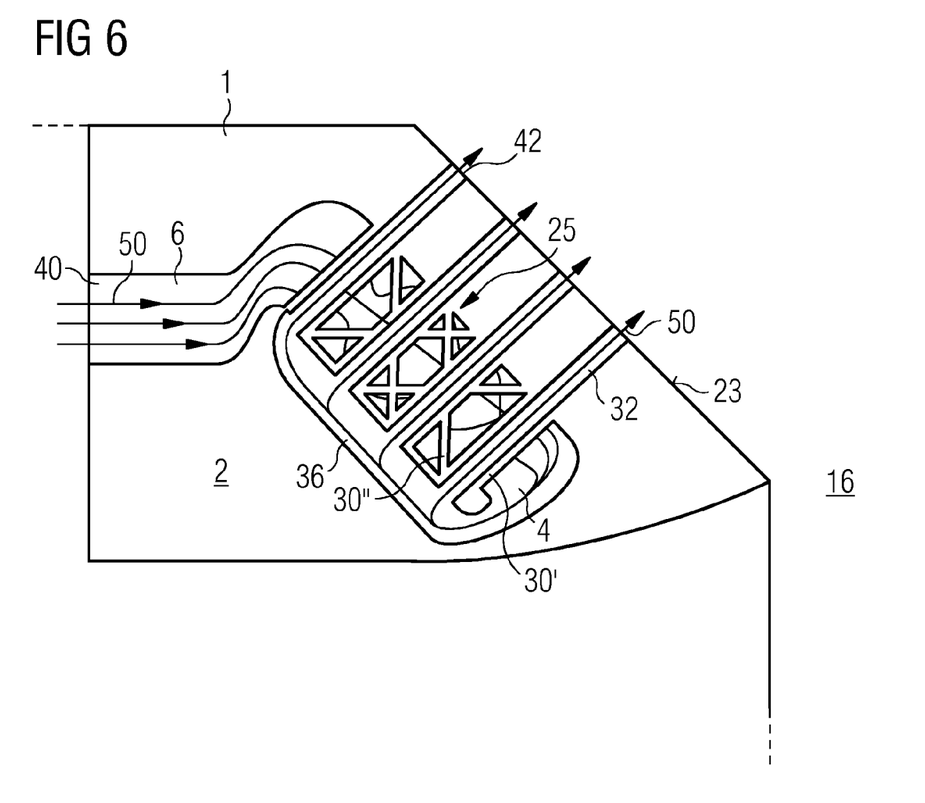
FIG. 6: shows a sectional view of an alternative embodiment showing a mix of solid and hollow struts.

FIG. 6 shows now a cross-sectional view of another variant of the cooled machine component 1, in which the previously introduced components are again present. The void space 35 differs from the previous design that it includes a plurality of hollow struts 30' and additionally a plurality of solid struts 30". Both of these elements arranged in the void space 35 define the lattice structure 25.

In this embodiment the hollow struts 30' are directed perpendicularly to the end face 23. The solid struts 30" are angled in respect of the hollow struts 30'. A cooling fluid flow 50 is indicated winding through the void space 35 around the struts 30',30" and later through the plenum chamber 36 and the hollow interior of the hollow struts 30' before ejecting into the combustion zone 16.

Figure 7:
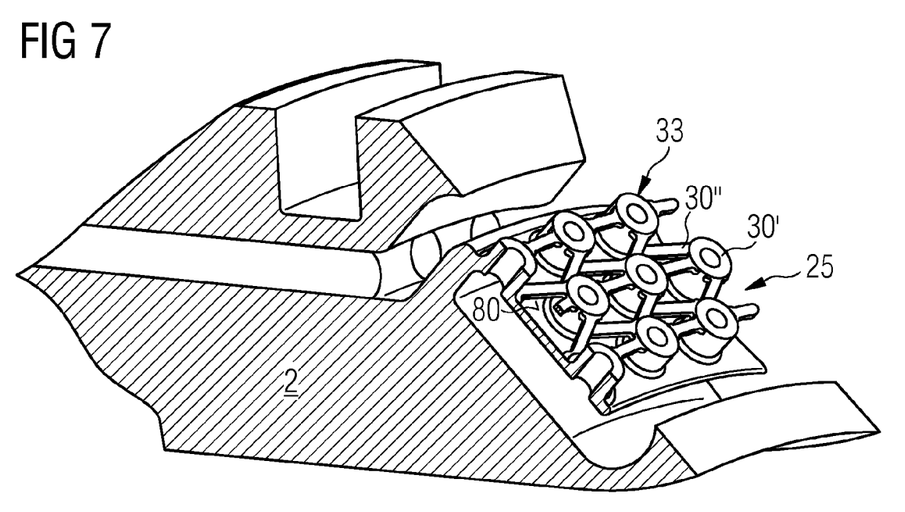
FIG. 7: shows an angled view merging into a sectional view of a variant of the embodiment of FIG. 6.

FIG. 7 shows a similar view as shown in FIG. 5, but including solid struts 30" as introduced in FIG. 6.

In this example the solid struts 30" have a smaller diameter than the hollow struts 30'.

Further on, the solid struts 30" are arranged such that some solid struts 30" are cross bars to the hollow struts 30', i.e. defining a connection perpendicular to an expanse of the hollow struts 30' between adjacent pairs of hollow struts 30'.

Besides, some solid struts 30" are arranged that they are connected to hollow struts 30' at merging region at which the hollow struts 30' connect to a boundary wall 80 of the void space 35. In the example another end of the solid struts 30" are connected to a mid region of jackets 33 of the hollow struts 30'.

As this is a sectional view, FIG. 7 does not shown how the solid struts 30" continue in direction of the end face 23, which is also not shown. In one embodiment the same configuration as explained before will continue in direction of the end face, so the solid struts 30" will be connected to another boundary wall (not shown) and again to the jackets 33 of the hollow struts 30', possibly again in a mid region of the hollow struts 30'.

More complex arrangements of struts 30',30" can be provided within the lattice structure 25.

Figure 8:
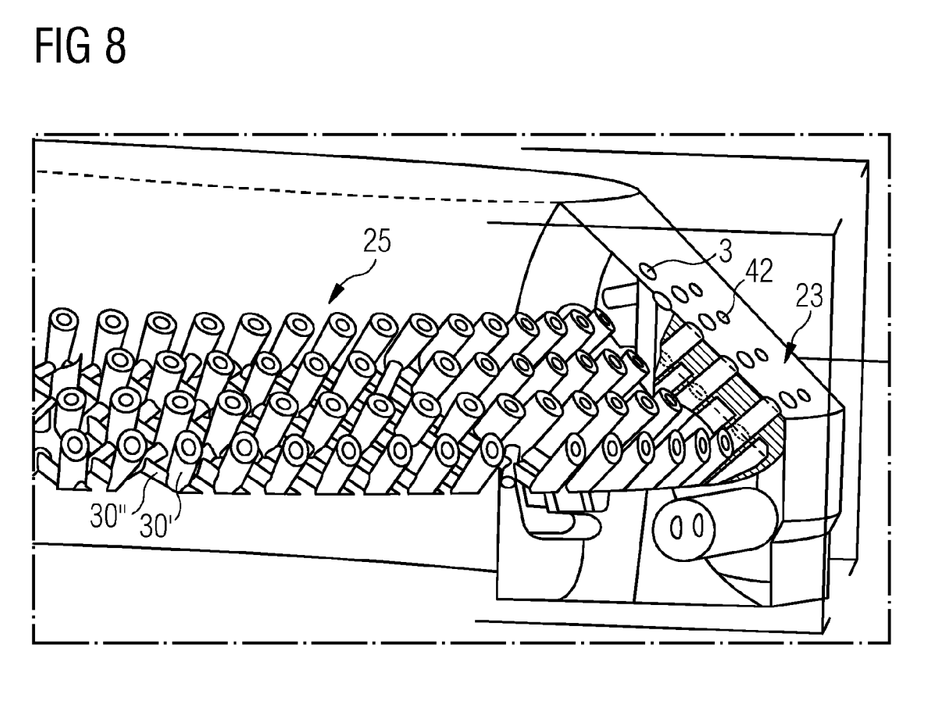
FIG. 8: shows schematically a three dimensional see-through view of a lattice structure.

FIG. 8 shows a see-through three-dimensional schematic drawing in which a further exemplary lattice structure 25 is shown in parts. The lattice structure 25 itself is defined by cylindrical or even conical hollow struts 30' that are arranged in the periodical way. Furthermore the hollow struts 30' show some cross bars at a position distant to the first section 20. These cross bars are again the solid struts 30". In this example almost half of the available space in the void space 35 is consumed by the material of the struts 30',30". The other half remains the void space 35 through which the cooling air can be guided.

In FIG. 8 also the fuel nozzle 3 is shown again, for which the lattice structure 25 may be interrupted within the body.

Figure 9:
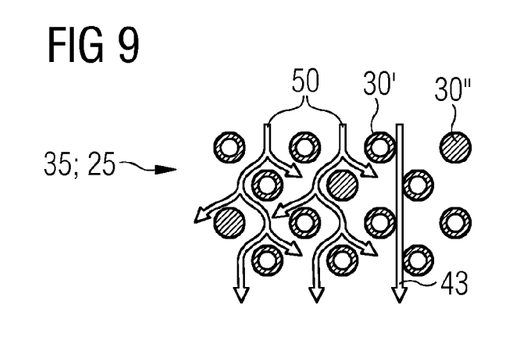
FIG. 9: shows a lattice structure and a local cooling fluid flow through the lattice structure.

FIG. 9 now shows a sectional view through another the lattice structure 25 as seen from the end face 23. The struts 30',30" are indicated by circles which show the cross section of the struts 30',30". The solid struts 30"—indicated by a hatching within the cross section—and the hollow struts 30'—indicated by a hatching within a ring in the cross section and a hollow interior—are arranged this time all parallel to another and directed to the end face 23. A local cooling fluid flow 50 winding around the struts 30',30" is depicted by an arrow. A further double arrow indicated the abstract main travel direction 43 through the lattice structure 25. The void space 35 of the lattice structure 25 therefore defines generally a—fairly complex—cooling channel which will be used by the cooling fluid flow 50. As indicated in FIG. 9, the fluid flow of the cooling fluid will be in contact with the outer surfaces of the struts 30',30" and therefore a heat transfer will occur and heat from the struts 30',30" will be passed on to the cooling fluid of the cooling fluid flow 50.

Figure 10:
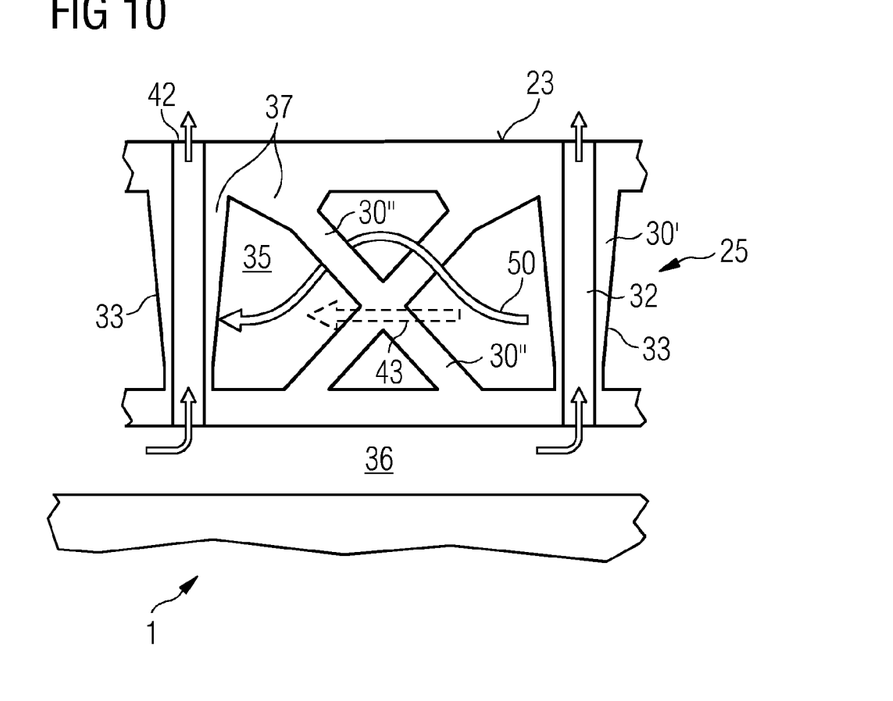
FIG. 10: shows a lattice structure with interconnected struts.

According to FIG. 10 a variant of a further embodiment of a lattice structure 25 is shown in a schematic way. In the example a pair of solid struts 30" will intersect in the centre of the void space 35. In the example the solid struts 30", which are angled in relation to the end face 23, have a conical shape 37 at one end, the conical shape 37 being inclined due to the orientation of the solid struts 30". A cooling fluid flow 50 is indicated in the FIG. 10 only as an example to show how the cooling fluid (i.e. air) will need to meander around the struts of the lattice structure 25.

In this figure also a further variant of the hollow struts 30' is shown. In that variant the hollow interior 32 of the hollow struts 30' may remain cylindrical as indicated in the previous sections, while the jackets 33 are now conical (different to the previously shown cylindrical jacket shape), i.e. following a conical shape 37. This could improve the heat conduction from the end face 23 into the lattice structure 25. Thus, the hotter end of the hollow struts 30' may have a larger skin surface and therefore a larger expanse of attack for the cooling fluid.

Figure 11:
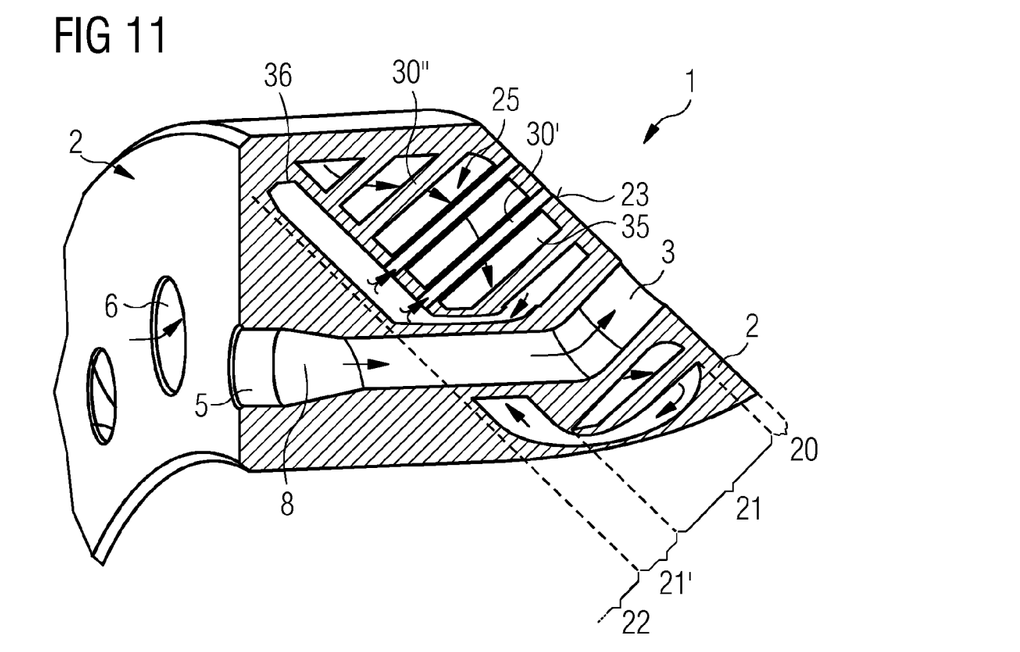
FIG. 11: shows a cut through a burner head illustrating a fuel passage surrounded by a lattice structure for cooling.

Finally, FIG. 11 now shows an embodiment in a sectional view of a three dimensional burner head in which a cooling channel with a lattice structure 25 is incorporated, together with a fuel line 8. The burner head shows the body 2 which can be structured as having a first section 20, a second section 21 and a third section 22. These sections 20,21,22 are portions of a common monolithic body. The first section 20 is that section of the body 2 that is closest to a hot region, in this example closest to the combustion zone 16. The first section 20 comprises the end face 23 that is directly facing the combustion zone 16. The second section 21 comprises the lattice structure 25 which is shown in an exemplary way by a few hollow and solid struts 30',30". Further distant to the end face 23, the third section 22 is present that mainly is a solid body with embedded passages of the cooling channel and the fluid line 8. A plenum section 21' is located between the second section 21 and the third section 22, which comprises the plenum chamber 36.

The shown embodiment is merely a simplification of a potential implementation of the invention. It shows as a lattice structure 25 a few solid struts 30" and as an example two hollow struts 30'. An inlet port of the inlet 6 to the cooling channel is shown. Initial internal passages of the cooling channel are not shown, but the void space 35, the plenum chamber 36 and two exemplary hollow passages through the hollow struts 30' are shown purely as an example. The cooling system is interrupted for the fuel line 8. The fuel line is fed by a fuel inlet port 5. The fuel—possibly pilot fuel—is exhausted vie the fuel nozzle 3. According to this embodiment the fuel line 8 simply passes through the body 2 without connecting to the cooling channel. The lattice structure 25 will not mix with the fuel line 8. The lattice structure 25 will simply be stopped in the region of the fuel line 8 and then continued afterwards or surrounding the fuel supply region.

The end face 23, as in most of the presented embodiments, is following a conical shape of the overall substantially conical burner head. The burner head may be present as a pilot burner via which a pilot fuel and pilot air—as the cooling fluid but also as a chemical component for the combustion—is provided which then will be mixed in a combustion zone for stable combustion.

In this example again only a few struts 30',30" are shown. Further struts are not visible in this sectional view or are intentionally omitted so that the drawing can be understood better. The struts 30',30" in FIG. 11 are rod-shaped and totally cylindrical and are physically connected to the first section 20 and to a wall between the plenum chamber 36 and the void space 35. The struts 30',30" in the example are oriented perpendicularly to the surface of the end face 23, but could also be angled. Nevertheless, in the figure some of the solid struts 30" may end up and will be attached to a tilted surface which will be at an angle to the end face 23.

In all embodiments the struts 30',30" should be continued repetitively to be distributed in the void space 35. Several rows or planes of struts 30 may be present. One end of a hollow strut 30' should be connected to the hot first section 20. The struts 30',30" typically can be rod-shaped with a cylindrical expanse and a circular cross section, but other variants, like conical portions could be included. The void space 35 is particularly present so that the cooling fluid can flow through this void space 35. The void 35 is therefore acting as a fluid passage. The overall consumption of the void space 35 by material used within the struts 30',30" may be 15% up to 85% of the overall volume of the region of the lattice structure 25. Advantageously the ratio of material consumption may be 20% up to 40% of the overall volume.

Other preferred ranges can be defined as ratio between a volume of solid material and a hollow volume of the lattice structure 25. This ratio may advantageously be between 0.3 and 2.5, particularly between 0.4 and 2.0 for a lattice structure 25 with a mix of hollow and solid struts. In case of using only hollow struts 30', a preferred ratio may be between 0.5 and 2.5.

The components of the body 2, particularly the first section 20, the second section 21, the plenum section 21', and the third section 22 will be generated as a single piece of metallic or alloy material. This complex geometrical arrangement (as indicated in the previous figures) can be generated by additive manufacturing, also called 3D printing. Examples for additive manufacturing are selective laser melting or selective laser sintering via which layer by layer a powder is applied onto a surface which then will be solidified and in the end will result in a final single component built from one material. Laser sintering may allow very complex and detailed cooling features in the lattice structure 25. It is preferable to generate the complete body 2 of the machine component 1 in one single production step by additive manufacturing. The result will be a monolithic component. It has to be noted that according to the invention casting is not considered to fall under the inventive concept. The term "lattice structure" itself is considered to define a quite complex design which cannot be produced by casting. The figures may be simplified and therefore may not exactly show that this cannot be produced by casting. Nevertheless the invention is directed to a component with a lattice structure that is particularly to be produced by additive manufacturing techniques.

The previous shown figures show different embodiments of the invention. All of these embodiments or at least some of the embodiments have similar advantages and features which will be summarized in the following.

Efficient cooling of a component will be gained via the specific lattice structure including hollow struts and optional solid struts, with at least a plurality of hollow struts attached to the surface to be cooled. If embodied in a gas turbine engine, the surface to be cooled is typically exposed to combustion temperatures of e.g. between 1300 and 2000° C. The cooling fluid corresponds to typical compressor exit temperatures, e.g. 350 to 550° C. So the fairly cool cooling fluid will enable to efficiently reduce the temperature of the component. Furthermore the hollow struts enable cooling from the outside and the inside of the struts. Besides, ejection of cooling fluid is distributed over an expanse of the component. Instead of having a reduced number of exit holes a plurality of smaller exit holes are present which cools the material of the component a further time.

The lattice structure may particularly be applied for surfaces in the vicinity of a pilot flame, as this location is one the most hostile environments in a gas turbine. The pilot flame may be present in order to stabilize a main flame or a primary combustion zone. Applying these cooling features may avoid oxidation or cracks that arise from thermo-mechanical fatigue.

As a side effect, the noticeable amount of void in the lattice structure reduces the weight of the component as well as material cost.

The invention is particularly advantageous due to the combination of application of additive manufactured lattice structures to gas turbine hot components such as burners. Without restriction, the invention can also be applied to other machines, particularly other engines or turbomachines, in which it is an aim to cool hot surfaces during operation of that machine, in which the heat is mainly generated internally to the machine due to operation of the machine. The invention may also apply to "passive" components that are affected by heat from an external source and that require cooling.

The invention claimed is:

1. A cooled machine component, comprising:
a body comprising an end surface, the body comprising at least one integrated cooling channel for guiding a cooling fluid through an interior of the body, the at least one integrated cooling channel comprising a lattice structure;
a void space defined in the body;
a plurality of hollow struts disposed in the void space forming the lattice structure;
at least one inlet for providing the cooling fluid to be guided through the void space of the lattice structure to meander around exteriors of the hollow struts in a main flow direction;
at least one outlet for receiving the cooling fluid that has been guided through the void space of the lattice structure;
a plenum chamber in a fluidic connection with the at least one outlet and hollow interiors of at least a subset of the hollow struts for receiving the cooling fluid from the at least one outlet and providing the cooling fluid into the hollow interiors of the subset of the hollow struts; and
a plurality of further downstream discharge ports located in the end face of the body, each of the plurality of further downstream discharge ports defined by an end of each of the hollow interiors,
wherein walls of the body surrounding each of the plurality of further downstream discharge ports are physically connected to corresponding jackets of the subset of the plurality of hollow struts;
wherein each one of the subset of the plurality of hollow struts is free of apertures in its jacket between the void space and the hollow interior and is arranged either perpendicular to the end face or with a maximum deviation from a perpendicular direction to the end face of 45°; and
wherein the subset of the plurality of hollow struts are oriented substantially laterally to the main travel direction of the cooling fluid through the void space; and
wherein cooling fluid flows through the lattice structure before entering the plenum chamber and then exits through the hollow struts.

2. The cooled machine component according to claim 1, wherein the end face, during operation, is exposable to a first temperature higher than a second temperature of the cooling fluid.

3. The cooled machine component according to claim 1, wherein the body and the lattice structure are a single piece, built from a common material.

4. The cooled machine component according to claim 1, wherein the void space is additionally penetrated by a plurality of solid struts,
wherein the plurality of hollow struts and the plurality of solid struts and the body are generated via additive manufacturing techniques, selective laser sintering, selective laser melting, or electronic beam melting.

5. The cooled machine component according to claim 1, wherein the void space is additionally penetrated by a plurality of solid struts,
wherein each one of at least a subset of the plurality of hollow struts and of the plurality of solid struts is configured rod-shaped.

6. The cooled machine component according to claim 1, wherein the void space is additionally penetrated by a plurality of solid struts,
wherein each one of at least a first subset of the solid struts is angled to a neighbouring one of the hollow struts, or intersecting one of the hollow struts.

7. The cooled machine component according to claim 1, wherein the void space is additionally penetrated by a plurality of solid struts,
wherein the plurality of hollow struts and the plurality of solid struts define a periodical structure.

8. The cooled machine component according to claim 1, wherein in a region of the void space, a ratio between a volume of solid material and a hollow volume of the lattice structure is between 0.3 and 2.5.

9. The cooled machine component according to claim 1, wherein the body comprises a plurality of segments, each segment providing a single one of the at least one integrated cooling channel which is fluidically separated from further ones of the at least one integrated cooling channel that are located in further segments.

10. The cooled machine component according to claim 9, wherein each one of the segments comprises a plurality of discharge ports, each discharge port is provided with cooling fluid from a single one of the plurality of hollow struts.

11. The cooled machine component according to claim 1, wherein the cooled machine component comprises a turbomachine component.

12. The cooled machine component according to claim 8, wherein in the region of the void space, a ratio between a volume of solid material and a hollow volume of the lattice structure is between 0.4 and 2.0.

* * * * *